July 12, 1966 L. E. KING 3,260,840

VARIABLE MODE ARITHMETIC CIRCUITS WITH CARRY SELECT

Filed Dec. 28, 1961 7 Sheets-Sheet 1

INVENTOR
LEWIS E. KING

BY D. Kendall Cooper

ATTORNEY

July 12, 1966 L. E. KING 3,260,840

VARIABLE MODE ARITHMETIC CIRCUITS WITH CARRY SELECT

Filed Dec. 28, 1961 7 Sheets-Sheet 2

VARIABLE MODE ARITHMETIC CIRCUITS WITH CARRY SELECT

Filed Dec. 28, 1961 7 Sheets-Sheet 3

VARIABLE MODE ARITHMETIC CIRCUITS WITH CARRY SELECT

Filed Dec. 28, 1961 7 Sheets-Sheet 4

FIRST LEVEL SWITCH MATRIX

FIRST LEVEL SWITCH MATRIX

SECOND LEVEL SWITCH MATRIX

SECOND LEVEL SWITCH MATRIX

VARIABLE MODE ARITHMETIC CIRCUITS WITH CARRY SELECT

Filed Dec. 28, 1961 7 Sheets-Sheet 6

VARIABLE MODE ARITHMETIC CIRCUITS WITH CARRY SELECT

Filed Dec. 28, 1961 7 Sheets-Sheet 7

SAU CARRY LOOKAHEAD ADDER

WRITE IN SWITCH MATRIX 3,260,840
Patented July 12, 1966

3,260,840
VARIABLE MODE ARITHMETIC CIRCUITS WITH CARRY SELECT

Lewis E. King, Poughkeepsie, N.Y., assignor to International Business Machines Corporation, New York, N.Y., a corporation of New York Filed Dec. 28, 1961, Ser. No. 162,893
5 Claims. (Cl. 235—169)

This invention relates to circuits for use in data processing systems, and more particularly to arithmetic circuits.

The invention is especially useful in data processing systems like that discussed in a paper entitled, "Processing Data in Bits and Pieces," by F. P. Brooks, Jr., G. A. Blaauw, and W. Buchholz, which appeared in the IRE Transactions on Electronic Computers, June 1959, volume EC–8, No. 2, pages 118–124, inclusive; and in another paper entitled, "The Engineering Design of the Stretch Computer," by Erich Bloch which was published in the 1959 Proceedings of the Eastern Joint Computer Conference, No. 16, pages 48–58. The system described in the aforementioned paper handles data in variable field lengths of one to sixty-four bits, and performs arithmetic operations in a binary mode or decimal mode under control of predetermined instruction codes.

The variable field length equipment includes a two word (128 bits) accumulator register (AB) and a two word nonaddressable receiving register (CD). Data transfer to and from main memory takes place in parallel, 64 bits at a time, through the CD register.

Since field lengths are restricted to 64 bits, any field will be completely contained in not more than two adjacent memory words. An operand may overlap word boundaries, but it can still be fetched from memory by bringing the two words containing it to the CD register.

Considerable flexibility is realized in the system by providing a serial arithmetic and logical unit which handles bytes up to eight bits in length from the field selected. Bytes are selected one after another beginning at the right end of the field. Masking circuits permit selection of particular bits within each byte. Bits are thereby selected from the operand register and the accumulator register and passed through the adder and logical circuits. The selection, arithmetic, and logical processes continue for as many times as required until the end of the field specified has been reached. In this way, operands from the AB and CD registers are processed piecemeal, but in a rapid, coordinated and completely flexible fashion.

Prior arithmetic techniques have not been satisfactory in the aforementioned data processing environment, and the various features such as mode selection and variable field length that lend flexibility to the system have necessitated the development of new approaches.

Accordingly, an object of the invention is to provide arithmetic circuits which are capable of operating in a number of digital modes.

Another object of the invention is to provide arithmetic circuits for processing operands of variable length.

A further object of the invention is to provide carry select controls for an arithmetic unit.

Another object of the invention is to provide selection circuitry which enables an arithmetic unit to process data bytes of variable length with proper carry determination and carry-over regardless of the respective lengths involved.

In addition, an object of the invention is to provide common arithmetic circuitry for processing data in a number of digital modes, and in bytes of variable length.

In order to accomplish these and other objects of the invention, arithmetic circuits have been provided for processing binary or decimal operands of variable length, with carry propagation and related functions being automatically selected for the mode and length involved.

The foregoing and other objects, features and advantages of the invention will be apparent from the following more particular description of the preferred embodiment of the invention as illustrated in the accompanying drawings.

*General description*

Figure 1:
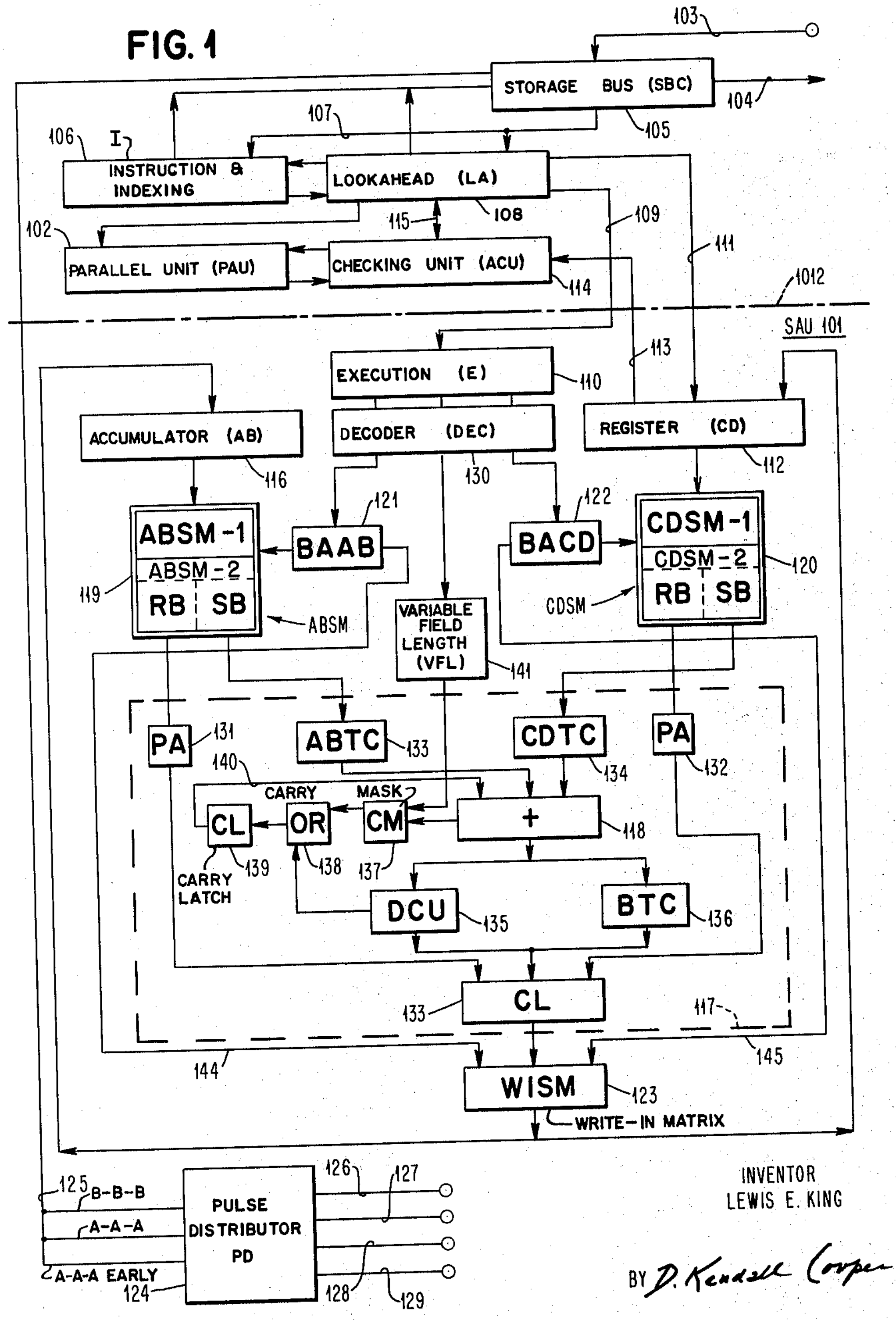
FIGURE 1 is a block diagram of a data processing system in which a preferred embodiment of the invention is incorporated.

The data processing system of FIGURE 1 processes variable fields of either binary or decimal information. The variable fields are processed on a byte-by-byte basis. A byte may be defined as a small unit of either decimal or binary data. A binary field is processed in bytes of from one to eight bits and a decimal field is processed in bytes of one to four bits. Variable field length binary and decimal ADD-type operations are executed by the Serial Arithmetic unit (SAU) 101, which comprises the circuit blocks below the line 1012.

The system of FIGURE 1 also includes a Parallel Arithmetic unit (PAU) 102, in which floating point mantissa operation and variable field length binary MULTIPLY and DIVIDE operations are performed.

Instructions and data are received from a main memory, not shown, over line 103 and results are returned to memory over line 104 through a Storage Bus Control (SBC) Unit 105. Instructions pass to an Instruction and Indexing (I) unit 106 by line 107. In the unit 106 each instruction is decoded, and if it is determined that an instruction is to be performed by an execution unit, the instruction is sent to a Lookahead (LA) unit 108 where further decoding takes place. The Lookahead unit 108 determines if the instruction is one for the Serial Arithmetic unit 101 or the Parallel Arithmetic unit 102. An instruction for the Serial Arithmetic unit 101 is sent over the transfer-out bus 109 and placed in the SAU Execution register (E) 110.

Following the transfer of an instruction to register 110, an operand is obtained. The I unit 106, in decoding the instruction, determines what operand is needed and where in main memory the operand is located. The I unit 106 automatically calls for a main memory read operation so that information comes from the memory through SBC 105 to LA 108. When LA 108 determines that SAU 101 is ready to perform an operation, and that it has the operation code in the Execution register 110, it sends the operand over the transfer-out bus 111 to a CD register 112. In the embodiment of FIGURE 1, the CD register is 128 positions long, although in processing fields of variable length the maximum operand from memory which may be processed is 64 bits. However, these 64 bits may involve word boundary crossover. In order that any case of word boundary crossover may be handled, it is therefore necessary to have 128 positions in the CD register 112. This allows for the possible case of a field length of 64, for example, where the high-order bit of the selected field is the last bit of one core storage word. It is necessary to read out one core storage word to get the single high-order bit, and also necessary to read out the next core storage word to get the other 63 bits. Information to or from SAU 101 is always routed through the CD register 112. When returning to main memory, data from the register 112 passes by bus 113 to an Arithmetic Checking Unit (ACU) 114, where certain checks are made on the information, and then to LA 108 by bus 115. In LA 108, the operation is examined to determine where in main memory the information is to be stored. Lookahead 108 then takes the appropriate action to send the data to the Storage Bus Control 105 along with the main memory address involved.

Most SAU 101 operations require a second operand, in addition to the one just mentioned. The second operand is usually implied as the data that is stored in the AB register 116, which is an accumulator register. The AB register 116 is like the CD register 112, and contains 128 positons; but all 128 positions form the implied operand.

The three basic units of SAU 101 are the CD register 112, which contains the operand from main memory, the AB register 116 which contains the other operand, and logical circuitry 117, where the two operands may be combined arithmetically or logically. In FIGURE 1, data is routed from AB register 116 and CD register 112 into the logical blocks where an addition, subtraction, or other logical function takes place, and the result is written back into either AB register 116 or CD register 112, depending upon the operation. As an example, in an ADD-type operation, information from AB register 116 and CD register 112 are combined in an adder (+) 118 and the result is written back into the AB register 116. If, instead, the operation is ADD TO MAIN MEMORY, the same arithmetical function takes place in the logic unit 117, but the data is returned to the CD register 112, rather than the AB register 116.

Data in the AB and CD registers may be in any location and may be in any format. In order to allow handling of various field lengths and fields in various locations and to minimize circuitry, unique means for controlling the read-out of the AB and CD registers is needed. Data is read out of either the AB register or the CD register under control of respectively associated switch matrices ABSM 119 and CDSM 120, 16 bits at a time. The information required from the 16 bit groups is selected by the Bit Address control for the AB register (BAAB 121) and the Bit Address control for the CD register (BACD 122). Sixteen bits are read out from each register 112 and 116 but only eight bits are selected for any operation. These are designated the Selected Byte (SB). The remainder of each 16 bit group is designated the Residual Byte (RB).

Selected bytes from the AB and CD registers are fed through the logic unit 117, where arithmetic functions take place, and from there to a Write-In Switch Matrix (WISM 123). Here, write-in control is applied from either the AB Bit Address control 121 by line 144 or the CD Bit Address control by line 145 depending upon whether writing is to be into the AB register 116 or the CD register 112. Only one write-in switch matrix is required, because no SAU 101 operation requires writing into both the AB and CD registers at the same time. Therefore, one set of write lines suffices for both registers. The information contained in the Bit Address controls 121 and 122 are derived from the instruction in the Execution register 110. The register 110 will contain data definition fields which tell where the information starts in both the AB and CD registers, how much of the information is to be handled on each cycle, and when processing of information is to be terminated.

*Pulse distributor*

Figure 3:
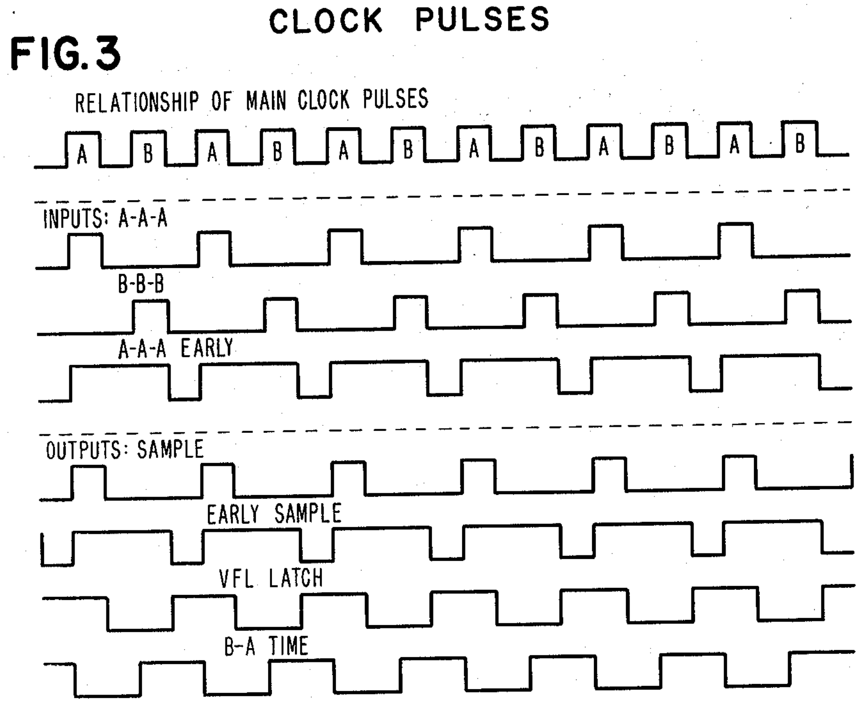
FIGURE 3 represents typical timing pulses that are useful in the system of FIGURE 1.

A pulse distributor (PD) 124 in FIGURE 1 receives main clock pulses over bus 125 and supplies various output pulses on lines 126–129 as shown in FIGURE 3. The inputs to PD 124 are A—A—A, B—B—B, and A—A—A Early. These inputs are utilized to provide a number of output pulses.

The A—A—A Early pulse or Early Sample pulse gives SAU 101 an advance signal that the next data cycle is going to commence. At this time, the read-out addresses are updated in preparation for starting the data cycle. The Early Sample and the A—A—A pulses together produce a timing system for each SAU data-handling cycle. The VFL Latch gate is used to hold information or prevent any change of the output from the SAU logic unit during sample or write-in time. It is at this time that the control lines are changed and the read-out bit address registers are updated in preparation for the next cycle.

The B–A Time gate is used when SAU wishes to communicate or pass information to other units. In order that other units may be ready to accept the information by sampling with an A pulse, SAU must gate its signal to the acceptor prior to this time or with a B–A Time pulse.

Figure 4:
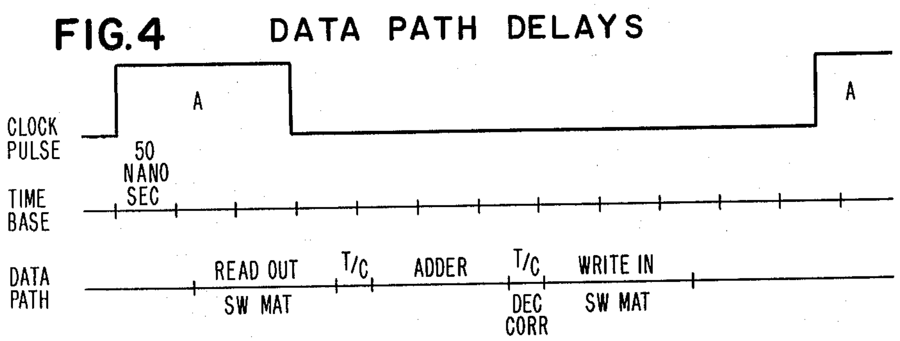
FIGURE 4 represents an arithmetic cycle in the system of FIGURE 1.

In all SAU instructions, the operation is performed by successively handling bytes of data until the complete field is processed. Each byte of data is extracted from the arithmetic register at A pulse time. The data is passed through the SAU logic which consists of open-type gated circuits or circuitry that does not contain registers requiring intermediate set pulses. The information is then written back into the register at the next successive A pulse. The action of handling each byte of data is termed a cycle. The cycle is timed from one A pulse to the next A pulse. FIGURE 4 indicates the approximate time necessary for data to pass through each area of the data path.

*Serial arithmetic unit*

Operations or instructions that are performed in SAU 101 may be classified in several different categories. The biggest category is that of integer arithmetic instructions. This category may be further broken down into add-type instructions and combined operation instructions. The add-type instructions, which include ADD, ADD TO MEMORY, STORE, LOAD, and COMPARE, are performed entirely in SAU 101. The combined operations are performed partly in the SAU 101 and partly in the PAU 102. The PAU, designed for high-speed floating point calculations, multiplies and divides at a high rate of speed. The SAU was designed to take advantage of this speed in the PAU to perform the multiplication and division for the SAU. Accordingly, in the combined operations of MULTIPLY, MULTIPLY AND ADD, and DIVIDE, the SAU 101, merely arranges the data in a format which will allow the PAU 102 to operate on them. The second major category of operations involve the logic connectives, which are instructions for performing AND, OR and other logic functions between main memory and accumulator data.

Figure 5:
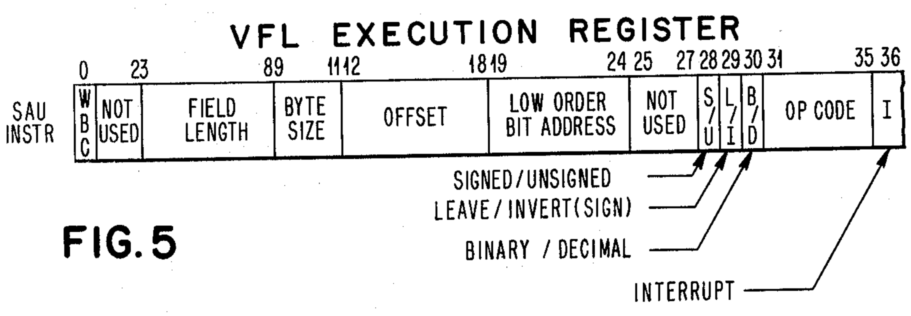
FIGURE 5 is an instruction format.

A typical instruction format for integer arithmetic operations is shown in FIGURE 5. Any instruction for SAU 101, including the type shown in FIGURE 5 is sent to the Execution register 110 for decoding in the DEC circuitry 130. The significance of some of the bit positions in the instruction of FIGURE 5 is indicated below:

Position 0 contains a 1 if word boundary cross-over (WBC) is involved in the operand. The effect of this bit is to add 64 to the bit address of the instruction when the operand overlaps two words. To illustrate the effect, consider a particular bit address. The instruction specifies bit 50 with field length 24. In the I unit 106, the field length is added to the bit address to give a modified bit address of 10, which specifies the units position of the field, and is the bit address as it arrives in the Execution register 110. If WBC is involved, the bit in position 0 causes 64 to be added to the above, giving a total address of 74. This is address 10 of the D register.

Positions 3 through 8 contain the field length information.

Positions 9 through 11 specify the byte size.

Positions 12 through 18 contain the offset which defines the right end of the Accumulator (AB register 116) field.

Positions 19 through 24 contain the bit address of the right end of the operand in the CD register. This information is modified by the WBC bit as described for position 0.

Position 30 indicates whether the operation is in a Binary or Decimal mode.

Positions 31–35 define the type of operation. All operations are decoded in Decoder (DEC) 130. Each operation code causes one line to come up which is associated only with that instruction, plus several lines used in common with other operations.

*The AB and CD registers*

The AB and CD registers are composed of 128 positions of storage. The storage positions are numbered from zero on the high-order end to 127 at the low-order end. In the system of FIGURE 1, the AB register 116 is actually a storage location that is addressable. The A register replaces core storage location 8 and the B register replaces core storage location 9. The CD register 112 is not addressable and is accessible only from Look-ahead 107 and the Arithmetic Check unit 114. Each register contains sixteen 8-bit bytes. The registers are divided into bytes in order to facilitate processing data and also facilitate checking.

*AB and CD read-out control*

As mentioned, sixteen bits are read out from each register to a first level of its associated switch matrix, designated ABSM–1 and CDSM–1, respectively. These bits are always read out on byte boundaries. If a bit position lies in the right 8-bit byte of a 16-bit group, it goes to one first-level switch matrix position. If it is in the left byte of a group, it goes to another first-level switch matrix position.

Figure 6:
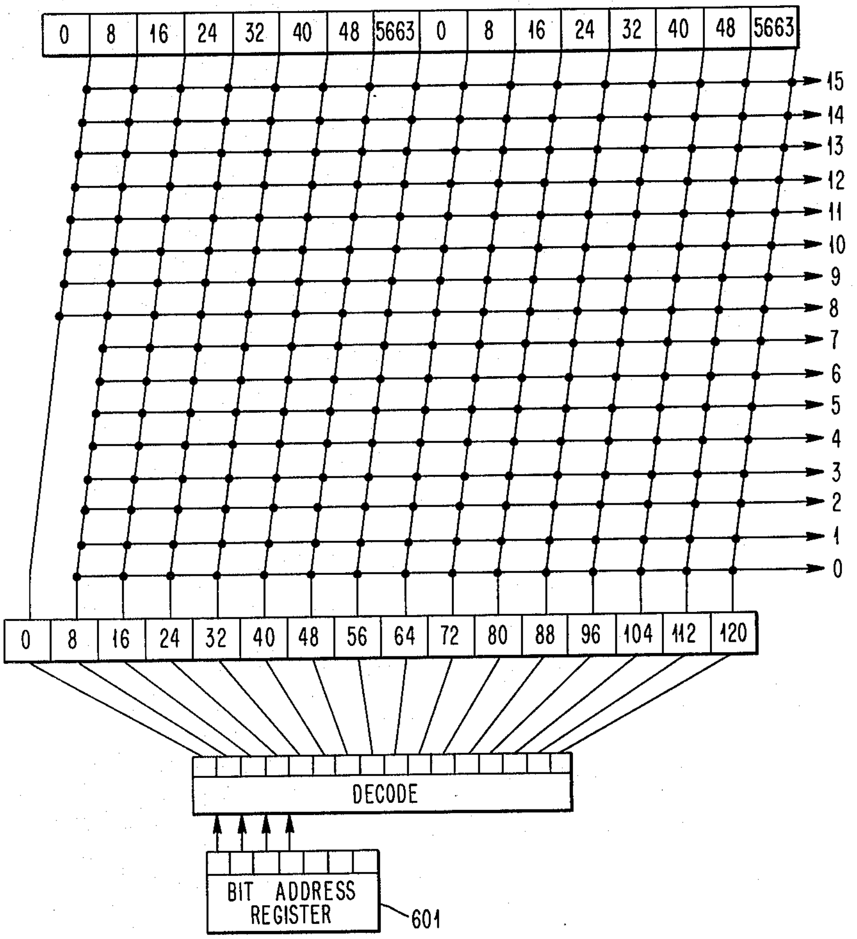
FIGURE 6 is a diagram of a switch matrix that is used in the system of FIGURE 1.
Figure 8:
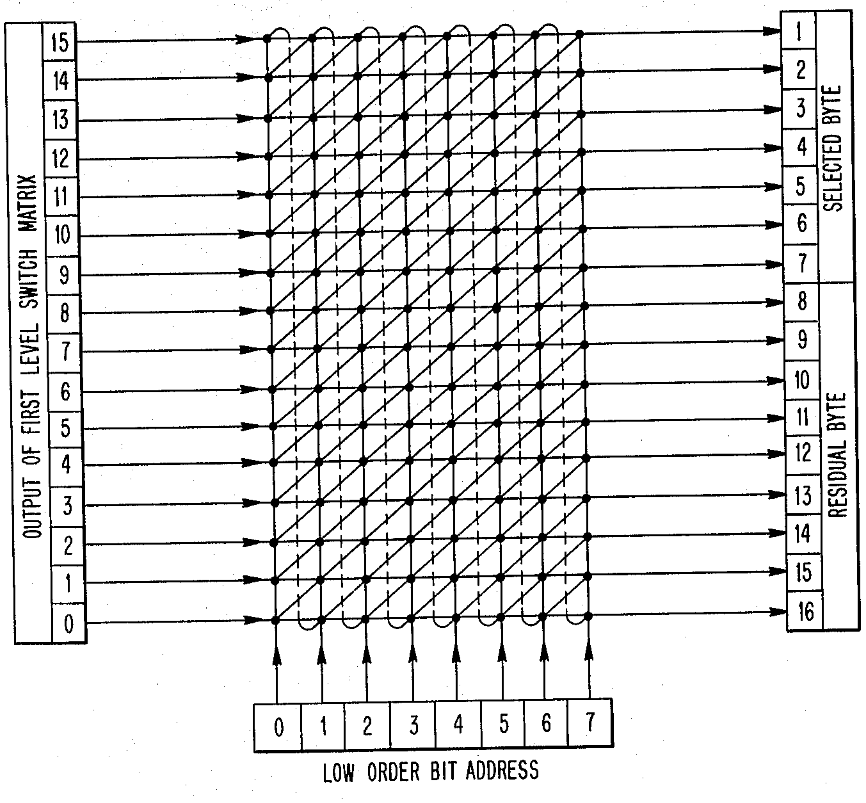
FIGURE 8 is another switch matrix that is useful in the invention.

In reading out from the AB and CD registers during an ADD operation, for example, it is necessary to select only a few bits out of a possible 128. Each read-out switch matrix is actually made up of two different circuits, a first-level, as shown in FIGURE 6 and a second-level, as shown in FIGURE 8. A switch matrix that corresponds to the switch matrix of FIGURES 6 and 8 is disclosed in copending application Serial No. 802,693, filed March 30, 1959, entitled, "Two Level Matrix," and assigned to the same assignee as the present application.

The function of the first-level switch matrix of FIGURE 6 is to read out two bytes of the total 16 bytes contained in the AB or CD register. The two bytes read are determined by the bit address in the associated bit address register, such as register 601, FIGURE 6. In SAU 101 operations, eight bits are the maximum number processed at one time but in order to be sure of selecting the eight bits required, 16 bits must be read out on byte boundaries.

Figure 7:
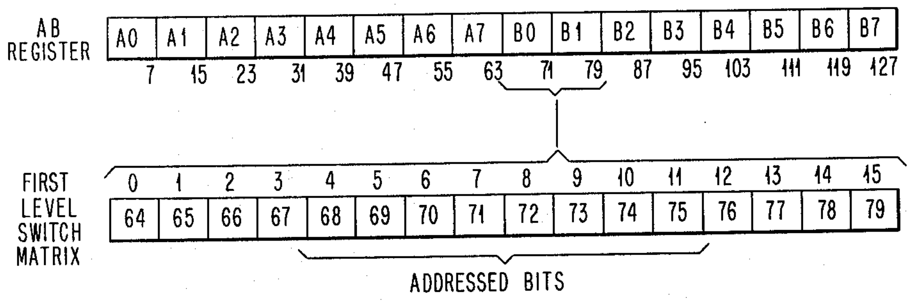
FIGURE 7 represents a switching operation in the matrix of FIGURE 6.

FIGURE 7 shows the operation of the first-level switch matrix. Here the AB register is divided down into 16 eight-bit bytes, labeled $A_0$ through $B_7$.

Taking a particular example of a binary ADD operation, assume that the address of the low-order position of the required 8-bit byte is 75. In the AB register, address 75 lies in byte $B_1$, but the eight bits required are not entirely in a single byte. It is therefore necessary to read out both bytes $B_0$ and $B_1$ into the first level switch matrix positions 0 through 15. The byte required lies in the middle of this group, that is, AB register addresses 68 through 75 or first-level switch matrix positions 4 through 11, FIGURE 6.

Figure 9:
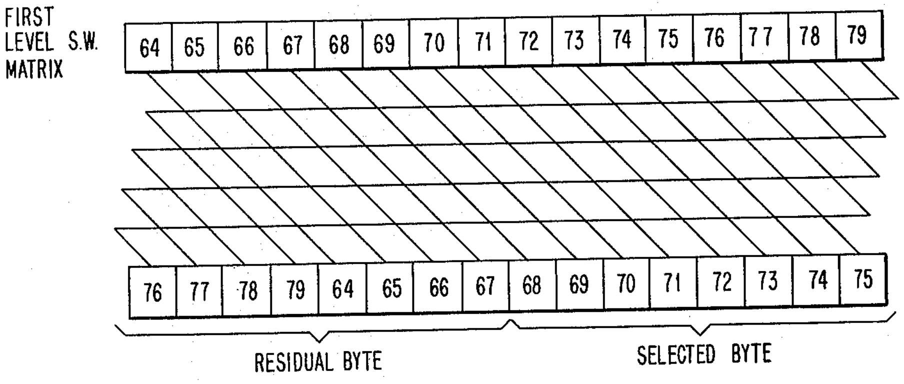
FIGURE 9 represents a switching operation in the matrix of FIGURE 8.

The Adder 118, FIGURE 1, cannot use these bits as they are now situated. In order for the selected byte to be processed by the Adder 118, the data must be on the extreme right end of the 16-bit field. Rearranging this field to put the selected byte on the right end of the field is the function of the second-level switch matrix, FIGURE 8, which performs a shifting operation. The shift amount is determined by the low-order bits of the address. In this particular case, the address 75 indicates that the units position of the selected byte is four positions away from the right-hand end of byte $B_1$. Therefore, in the second-level switch matrix of FIGURE 8 it is necessary to shift right four positions to align the selected byte properly with the Adder 118 inputs. FIGURE 9 shows how this is accomplished between the first and second level switch matrices.

After shifting the right-hand eight positions from the second level switch matrix are the selected byte, and the left eight positions form a residual byte, composed of bits not needed by the adders. In this example, where the byte size to be used in the arithmetic operation is eight, the selected and residual bytes are the same size. It would be possible under certain conditions to have a selected byte of less than eight bits, for instance, only one bit. In these cases, the size of the residual byte increases, as the size of the selected byte decreases. The residual byte does not enter into the calculations in the logic unit 117, but it is retained, passed around the logic unit 117, and recombined with the result before writing into the AB or CD register.

The right portion or selected byte of the second level switch matrix, in each case, goes to the logic unit 117. The left portion or residual bytes are fed to Pass-Around circuits (PA) 131 and 132, FIGURE 1. Only one of the Pass-Arounds 131 or 132 is active at any given time, as determined by the register being written into. For writing into the AB register, the AB Pass-Around 131 is active. For writing into the CD register, the CD Pass-Around 132 is active. Therefore, whichever register is the result register has the same residual bits written back in as were read out, plus the new result bits. The output of the logic unit 117 is therefore combined with the residual bits in a Combining Latch, (CL) 133, the output of which feeds the Write-In Switch Matrix 123.

*Write-in switch matrix*

In this example of an ADD operation, the right eight bits are the selected byte, and the left eight bits compose the residual byte. It is necessary to rearrange this information to put it back in the same format it was in when it was read out of the AB register. This requires shifting the information. This is performed by the Write-In Switch Matrix 123, which is shown in greater detail in FIGURE 12. The Write-In Switch Matrix 123 shifts the result in the combining latch left until it is in the proper location to be written back into the AB or CD register in the addressed location. The Write-In Switch Matrix 123 reverses the shifting work previously done by the second-level read-out switch matrix.

Figure 12:
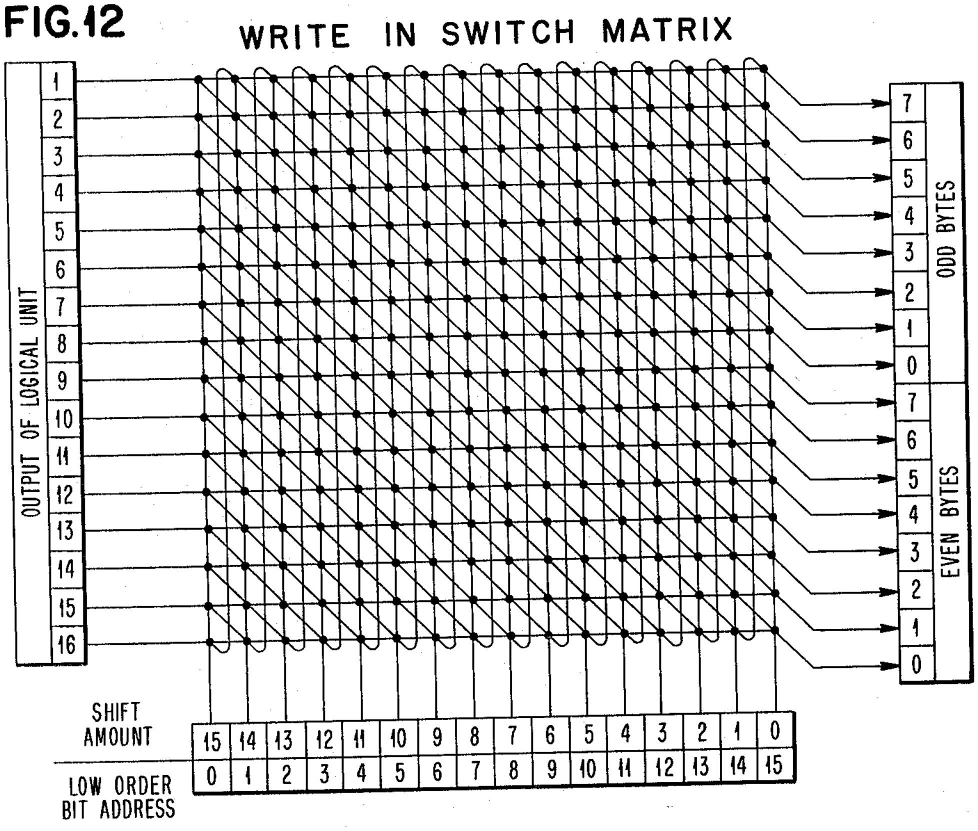
FIGURE 12 is another switch matrix that is used in the system of FIGURE 1.

As shown in FIGURE 12, the Write-In Switch Matrix receives 16 bits from the logic unit 117 with the result byte occupying the rightmost positions. The four low-order bits of the bit address of the result byte (which is the bit address of one of the original operand bytes) are decoded to determine the amount of shift. These low-order bits determine the data register position, within the sixteen, of the low-order bit of the result byte.

As with byte extraction, the result byte is embedded into the 16 that were originally read from the register, and all 16 are returned to their original positions, with the result byte replacing the original operand byte.

*Adder*

The Adder 118 in logical unit 117 is a 12-position adder with fast carry propagation. It is shown in greater detail in FIGURES 10 and 11.

Figure 10:
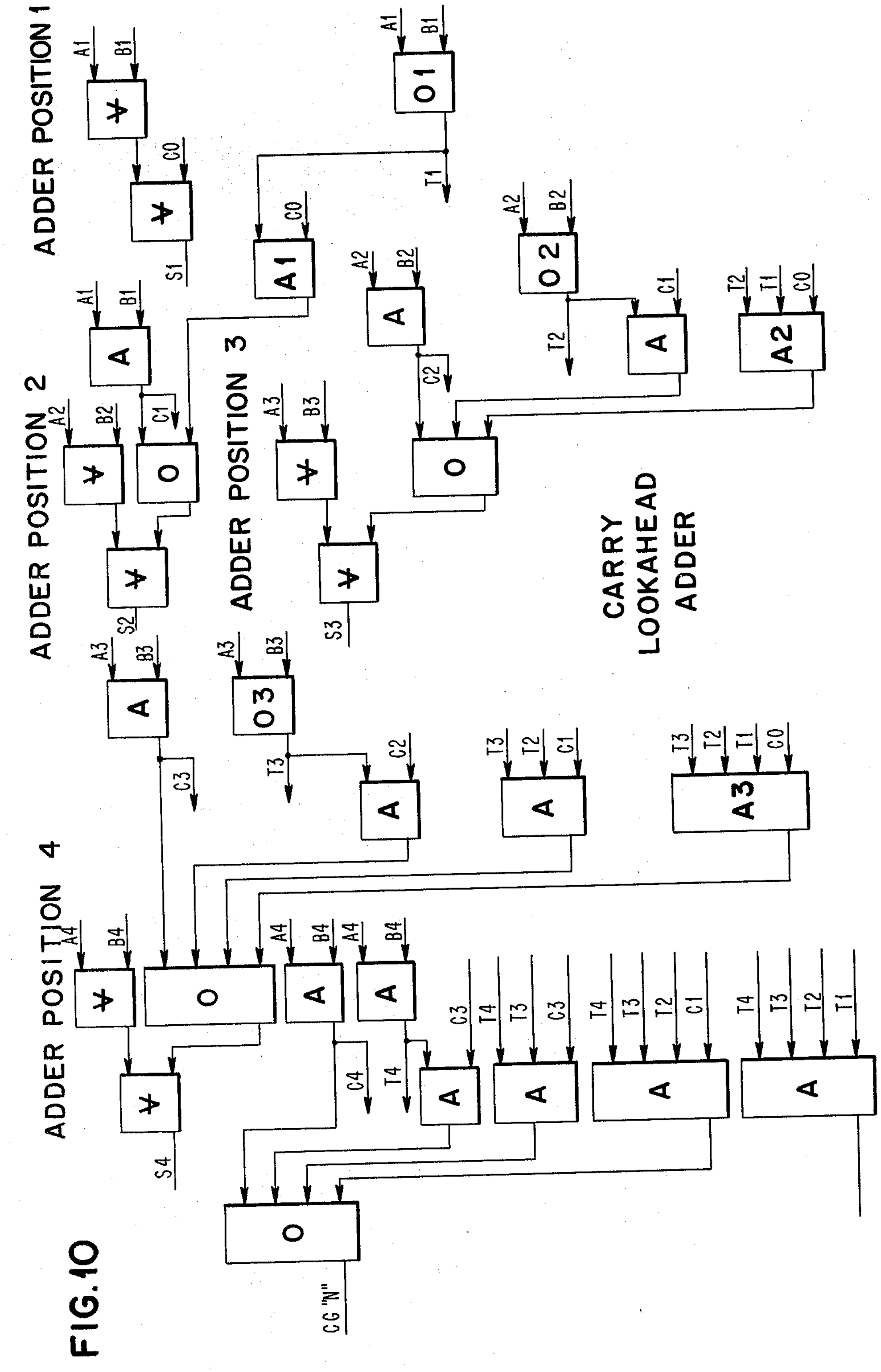
FIGURE 10 is an adder group that is used in the system of FIGURE 1.

The "ripple time" involved in a possible carry through a large conventional adder is not acceptable in a high-speed computer. Therefore, carry lookahead circuits are used. The carry lookahead type adder gains speed in operation through additional circuits that are able to predict how many positions will be affected by any carry and inject the carry into all affected positions almost simultaneously. FIGURE 10 shows the logic of a 4-position carry lookahead adder group.

The OR circuits (O1, O2, etc.) determine whether or not their respective adder positions are in a carry transmitting status, i.e., one of the inputs (A or B) is conditioned. An adder position in transmit status will pass any carry input on to the next position and if that position is in transmit status, the carry is also transmitted to the next higher position. Assume in FIGURE 10 that the A inputs to positions 1, 2 and 3 are each conditioned and a carry ($C_0$) is injected into position one. The $C_0$ carry is injected almost simultaneously into positions 2, 3 and 4 through AND circuits A1, A2 and A3. Carry transmission to adder positions within a group is called the first level of carry lookahead.

Figure 11:
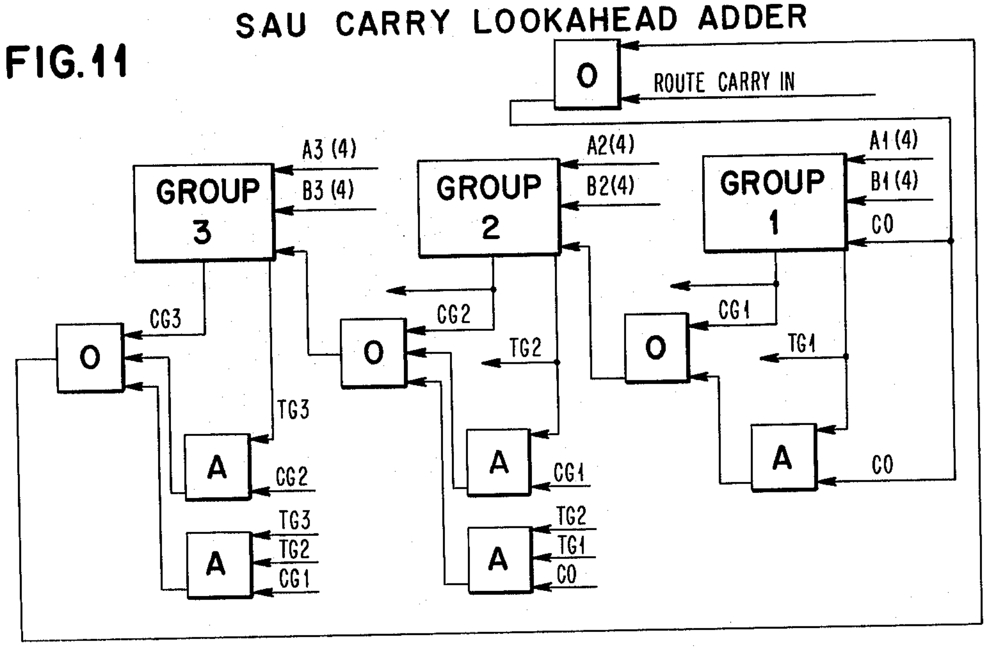
FIGURE 11 represents a combination of adder groups like that shown in FIGURE 10.

Although the increased speed of the carry lookahead adder over the conventional adder is apparent, the number of circuits required for lookahead purposes increases rapidly as the adder size is increased. For this reason, the carry lookahead adder is divided into groups of adder positions. The adder groups are checked by carry lookahead circuit in the same manner as individual adder positions. Thus, if all positions of an adder group are in transmit status, a carry-in to that group ($C_0$) is immediately sent to the next group. FIGURE 11 shows the logic of carry transmission from group to group within a section of a large adder. The group-to-group carry transmission is called the second level of carry lookahead. In both levels of carry lookahead, the logic is similar. First-level logic controls position-to-position carry within a group; second-level logic controls group-to-group carries.

As indicated in FIGURE 11, the Adder 118 has three 4-position groups of carry lookahead adders. The only function that can be performed in the Adder 118 is an addition. The SAU 101 subtracts by adding either the tens complement or twos complement, depending upon whether the operation is decimal or binary. This necessitates the provision of True-Complement units which pass the information straight through without modification for ADD operations. These are True-Complement blocks ABTC 133 and CDTC 134 in FIGURE 1. If a SUBTRACT operation is indicated and the radix specifies decimal, the True-Complement unit generates the nines complement of the number. If the binary radix is specified, the True-Complement unit generates the ones complement of the number. In the Adder 118, a carry is routed in on the first cycle of the subtraction to form either the tens or the twos complement. Because the Adder 118 is basically binary, the output is always in binary form. Therefore, its output must be decimally corrected when the decimal radix is specified. This is performed in the Decimal Correct unit (DCU) 135, FIGURE 1. In binary operations, decimal correction is suppressed and the output of the Adder 118 is applied through a Binary True-Complement block 136, instead. In SAU 101 operations, it is not known if the result is true or complement until the last byte has been processed. Therefore, when the last byte is processed, the machine circuits are interrogated to determine if the result is in fact true or complement. If true, the operation is ended. If complement, the entire result is again read out of the appropriate register, recomplemented in the True-Complement unit associated with that register, routed through the Adder 118, and written back into the result (AB or CD) register.

In SAU operations, only the right eight positions of the 12-position adder are used. The accumulated total is fed to the DCU 135 or the BTC 136. In decimal operations, the path is from the Adder 118 through the Decimal Correction circuit 135 and into the Combining Latch 133 to feed the Write-In Switch Matrix 123. The Binary True-Complement unit 136 is used in floating point operations and SAU binary operations.

Eight-bit bytes have been described as going to the 12-position adder. Actually, in binary operation, eight bits are normally fed from both AB and CD registers through the True-Complement units and to Adder 118. If, in binary operation, the field length specified is not a multiple of eight, the last byte used from both AB and CD registers is less than eight bits. In decimal operations, a 4-bit byte size is used. In this case, the left four bits from the CD register 112 to the adder are always zeros. The high-order four bits from the AB register 116 to the adder 118 are not blocked, but these positions are not gated out of Adder 118. In a decimal operation, it is possible to specify a byte size of less than four. If this is the case, high-order zeros are added to the CD byte and this expanded byte is combined with a normal byte from the AB register.

*Carry select units*

With the foregoing description in mind, a typical operation of the invention will now be considered. As noted, the SAU 101 operates either in a binary mode or a decimal mode as determined by bit position 30 of the instruction.

Associated with the Adder 118 in FIGURE 1 is a Carry Mask (CM) 137 which feeds an OR block 138. OR block 138 has another input from the Decimal Correct Unit 135. The output of OR block 138 is directed to a Carry Latch (CL) 139, whose output, in turn, returns to Adder 118 by line 140. The Carry Mask 137, Carry Latch 139 and associated circuits are shown in greater detail in FIGURE 2.

The Carry Mask 137 is controlled by inputs both from Adder 118 and a Variable Field Length (VFL) block 141. VFL block supplies various control signals and gating signals to CM 137, some of which result from interpretation of Execution register 110 outputs in Decoder 130.

Figure 2:
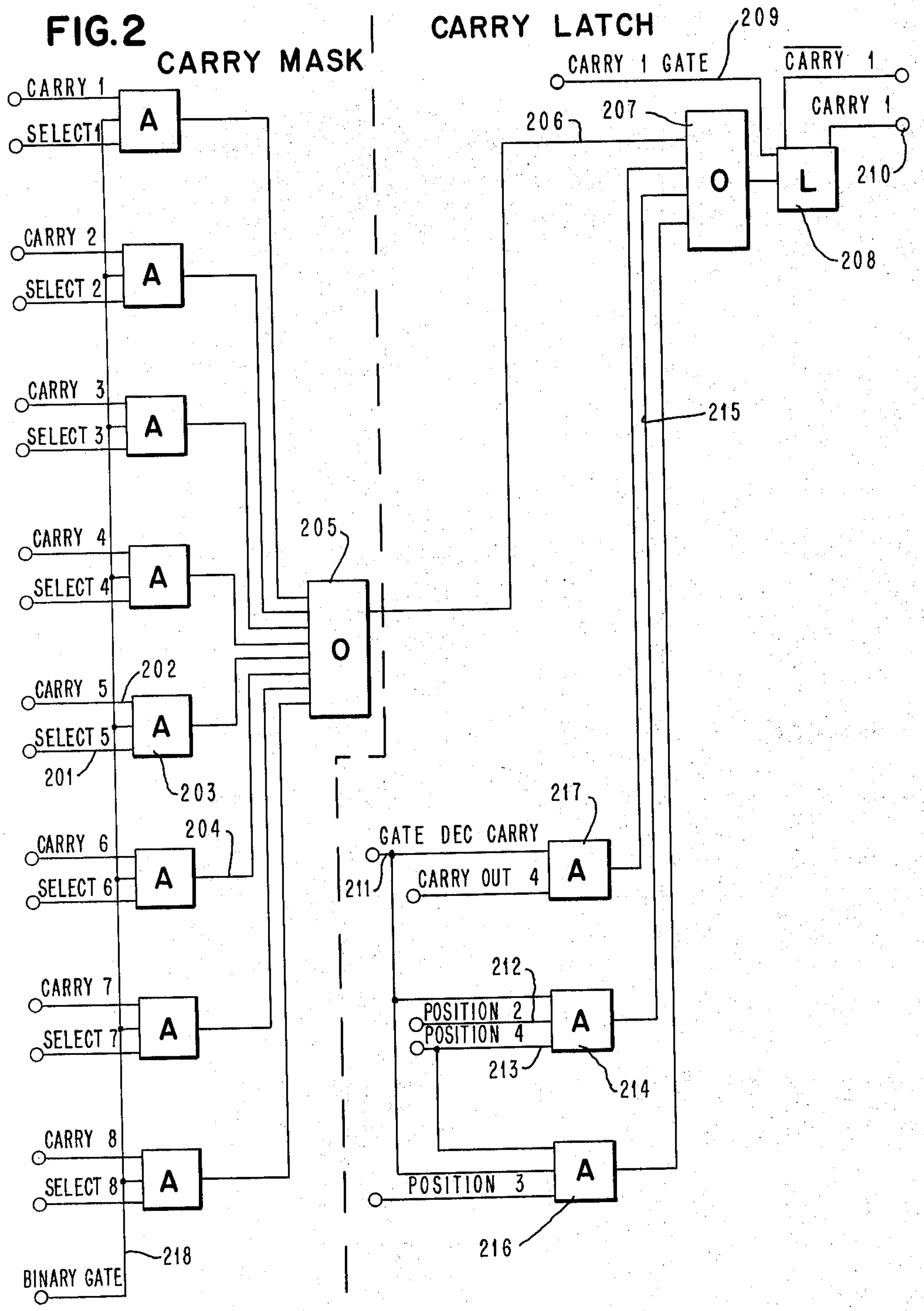
FIGURE 2 is a circuit that is used in the preferred embodiment of the invention shown in FIGURE 1.

With the circuit arrangements of FIGURE 2, proper carry determination is made during each cycle of operation for use in subsequent cycles, regardless of the mode or byte size involved.

In order to demonstrate the novelty of the invention, it will be assumed that a first operation involves the fixed point addition of a binary 18 to a binary 18. The bit configuration is as follows:

| | 16 | 8 | 4 | 2 | 1 |
|---|---|---|---|---|---|
| Byte from AB Register | 1 | 0 | 0 | 1 | 0 |
| Byte from CD Register | 1 | 0 | 0 | 1 | 0 |

Each byte involved is 5 bits in length. The proper bytes are selected by means of the switch matrices ABSM 119 and CDSM 120, with residual bytes going to the Passaround circuits 131 and 132. The output from the Adder 118 with the selected bytes is:

| | Carry | 16 | 8 | 4 | 2 | 1 |
|---|---|---|---|---|---|---|
| Result | 1 | 0 | 0 | 1 | 0 | 0 |

A carry has resulted out of the fifth position of the Adder 118.

Referring now to FIGURE 2, since a byte size of 5 is involved, the Select 5 line 201 is active. A carry from Adder 118 position 5 results in line 202 also becoming active. The Binary Gate line 218 is active as a result of decoding the related instruction. Lines 201 and 202 feed an AND gate 203, and when both are active, an output on line 204 through an OR block 205 activates one input 206 of an OR block 207. OR block 207 controls a Latch 208. The Latch 208 is a storage unit which retains the fact that a carry has occurred from the high-order position of the byte field involved. A gating pulse on the Carry 1 Gate line 209 maintains the Latch 208 set if an output occurred from OR blok 207. The Latch 208 output at terminal 210 is then applied to the low-order position of the Adder 118 for controlling subsequent addition operations.

If only one ADD cycle with two bytes is involved, and a Carry has occurred as above, the result that was written in the AB register is read back through the Adder 118 on the next succeeding cycle in order to propagate the carry just determined.

To further illustrate the invention, it will be assumed that a Decimal ADD operation is required. In this case, the Gate Decimal Carry line 211 is active as a result of decoding the related instruction.

A decimal operation involves bytes that are 4 bits long. A carry might therefore occur out of the fourth position during each ADD cycle.

Assume the following operands and position designations:

| | | | | |
|---|---|---|---|---|
| Position | 4 | 3 | 2 | 1 |
| Significance | 8 | 4 | 2 | 1 |
| Operand from AB Register | 0 | 1 | 0 | 1 (5) |
| Operand from CD Register | 0 | 1 | 0 | 1 (5) |
| Result | 1 | 0 | 1 | 0 (10) |

If decimal operands 0101 (5) and 0101 (5) are added together, the result is 1010, as shown, or decimal ten.

The Adder 118 outputs pass to a Decimal Correct Unit 135, FIGURE 1, which, in turn, supplies outputs to the OR block 138, which is OR block 207 in FIGURE 2.

If the result from Adder 118 has 1 bits in position 2 and 4, as in the result noted above, the lines 212 and 213 to AND gate 214, FIGURE 2, are activated. Line 211 was previously activated by decimal mode recognition, so that Gate 214 supplies an output to OR block 207 by line 215. The Carry Latch 208 will therefore be set to remember that a carry occurred in the cycle just completed.

The AND gate 216 supplies a similar output for the result configuration 1100, while AND gate 217 supplies an output for an actual carryout of position four of a decimal byte.

It is apparent that novel circuit arrangements have been provided for insuring correct processing of data bytes regardless of their length or arithmetic mode.

While the invention has been particularly shown and described with reference to a preferred embodiment thereof, it will be understood by those skilled in the art that various changes in form and detail may be made without departing from the spirit of the invention.

What is claimed is:

1. An arithmetic circuit comprising:
adder means having a predetermined number of positions, each position having means for providing a carry out;
means for supplying pairs of operands to said adder, said operands being represented in a plurality of radices;
means for determining the radix of each said pair of operands;
mode control means for establishing gating and control signals according to the radices of said operands;
individual carry select means respectively associated with said adder, and respectively operable during particular ones of said modes;
and means for activating a particular said carry select means when operands having a related radix are encountered.

2. An arithmetic circuit comprising:
adder means having a predetermined number of positions, each position having means for providing a carry out;
means for supplying pairs of operands to said adder, said operands being represented in a binary or decimal mode;
means for determining the mode of each said pair of operands;
mode control means for establishing gating and control signals according to the modes of said operands;
individual carry select means respectively associated with said adder, and respectively operable during particular ones of said modes;
and means for activating a particular said carry select means when operands having a related mode are encountered.

3. An arithmetic circuit comprising:
cyclically operating adder means having a predetermined number of positions, each position having means for providing a carry out;
means for supplying pairs of operands to said adder during successive cycles, said operands being represented in a plurality of radices;
means for determining the radix of each said pair of operands;
mode control means for establishing gating and control signals according to the radices of said operands;
individual carry select means respectively associated with said adder, and respectively operable during particular ones of said modes;
means for activating a particular said carry select means when operands having a related radix are encountered;
and storage means gated in common by any carry select; means activated during one cycle to thereby store a carry out from said adder for use in a subsequent cycle.

4. The invention as described in claim 3, wherein an individual carry select means is operative to gate out a carry from a position which corresponds to the high order position of an operand having less positions than said predetermined number in said adder means.

5. An arithmetic circuit comprising:
an adder having a predetermined number of positions, each said position having means for providing a carry out, said adder adapted to accommodate operands up to said predetermined number of positions;
means for supplying operands having lengths less than said predetermined number of positions to said adder during successive arithmetic cycles;
means for determining the length of any pair of operands involved during each arithmetic cycle;

gating and storing means under control of said determining means for gating and storing a carry out from a position in said adder less than said predetermined number which corresponds to the high order position of said operands, wherein said gating and storing means includes a coincidence circuit connected to each position of said adder, each said coincidence circuit having a conditioning input connected to said operand length determining means, whereby the length of an operand controls the conditioning of a coincidence circuit.

References Cited by the Examiner

UNITED STATES PATENTS

| | | | |
|---|---|---|---|
| 3,001,708 | 9/1961 | Glaser et al. | 235—157 |
| 3,019,979 | 2/1962 | Townsend | 235—170 |
| 3,118,055 | 1/1964 | Bensky | 235—159 |

MALCOLM A. MORRISON, *Primary Examiner.*

ROBERT C. BAILEY, *Examiner.*

S. SIMON, M. J. SPIVAK, *Assistant Examiners.*